(12) United States Patent
Reignault et al.

(10) Patent No.: US 10,831,033 B2
(45) Date of Patent: Nov. 10, 2020

(54) METHOD FOR ENCAPSULATING A LIGHT-GUIDE OPTICAL ELEMENT IN A TRANSPARENT CAPSULE

(71) Applicant: Essilor International, Charenton-le-Pont (FR)

(72) Inventors: Marc Reignault, Charenton-le-Pont (FR); Sira Uhalte Nogues, Charenton-le-Pont (FR); Mathieu Meynen, Charenton-le-Pont (FR); Ludovic Jouard, Charenton-le-Pont (FR); Benoit Callier, Charenton-le-Pont (FR); Loic Quere, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 590 days.

(21) Appl. No.: 15/031,633

(22) PCT Filed: Oct. 22, 2014

(86) PCT No.: PCT/EP2014/072693
§ 371 (c)(1),
(2) Date: Apr. 22, 2016

(87) PCT Pub. No.: WO2015/059215
PCT Pub. Date: Apr. 30, 2015

(65) Prior Publication Data
US 2016/0306176 A1 Oct. 20, 2016

(30) Foreign Application Priority Data
Oct. 22, 2013 (EP) ...................................... 13306457

(51) Int. Cl.
*G02B 27/01* (2006.01)
*B29D 11/00* (2006.01)
*B05D 1/00* (2006.01)

(52) U.S. Cl.
CPC .......... *G02B 27/0176* (2013.01); *B05D 1/005* (2013.01); *B29D 11/00663* (2013.01);
(Continued)

(58) Field of Classification Search
CPC .............. G02B 27/0176; G02B 27/017; G02B 27/0172; B05D 1/005; B29D 11/00663
See application file for complete search history.

(56) References Cited

U.S. PATENT DOCUMENTS 4,865,670 A * 9/1989 Marks .............. B29D 11/00865
156/99
5,886,822 A * 3/1999 Spitzer ............... G02B 27/0172
359/630

(Continued)

FOREIGN PATENT DOCUMENTS

EP 1866144 12/2007
FR 2866123 8/2005

(Continued)

OTHER PUBLICATIONS

International Search Report and Written Opinion dated Jan. 26, 2015; International PCT Application No. PCT/EP2014/072693.

*Primary Examiner* — Daniel McNally
(74) *Attorney, Agent, or Firm* — Oblon, McClelland, Maier & Neustadt, L.L.P.

(57) ABSTRACT

Method for encapsulating at least partly a light-guide optical element in a transparent capsule, the method comprising at least: —a transparent capsule providing step during which a transparent capsule is provided, —a light-guide optical element providing step during which a light-guide optical element is provided, —an adhesive deposing step during (Continued)

Figure 1A:
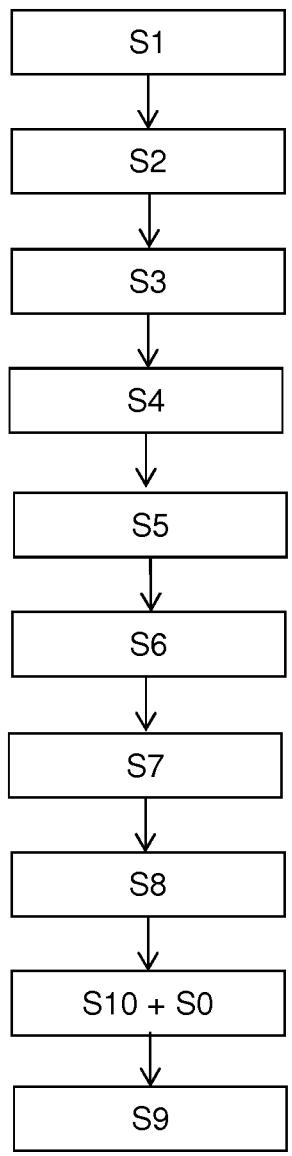

which an adhesive is deposited on at least part of a face of the transparent capsule and/or of a face of the light-guide optical element, —a positioning step during which the transparent capsule and the light-guide optical element are positioned one relative to the other so as to form an optical system, —a bonding step during which the light-guide optical element and the transparent capsule are made integral with the adhesive, wherein the method further comprises prior to the bonding step a control step during which at least one parameter of the optical system is controlled.

16 Claims, 5 Drawing Sheets

(52) U.S. Cl.
CPC ....... *G02B 27/017* (2013.01); *G02B 27/0172* (2013.01); *G02B 2027/0123* (2013.01); *G02B 2027/0161* (2013.01); *G02B 2027/0178* (2013.01)

(56) References Cited

U.S. PATENT DOCUMENTS

| | | |
|---|---|---|
| 6,250,759 B1 | 6/2001 | Kerns, Jr. et al. |
| 2004/0084790 A1* | 5/2004 | Blum ............... B29D 11/00028 351/159.03 |
| 2010/0033830 A1* | 2/2010 | Yung ....................... G02B 3/00 359/630 |
| 2010/0110567 A1* | 5/2010 | Glacet ................ B29D 11/0073 359/742 |
| 2010/0236058 A1* | 9/2010 | Lin ................... B32B 17/10807 29/729 |

FOREIGN PATENT DOCUMENTS

| | | |
|---|---|---|
| FR | 2866442 A1 | 8/2005 |
| WO | 2011062591 A1 | 5/2011 |
| WO | 2011095379 A2 | 8/2011 |
| WO | 2013006153 | 1/2013 |

* cited by examiner

METHOD FOR ENCAPSULATING A LIGHT-GUIDE OPTICAL ELEMENT IN A TRANSPARENT CAPSULE

The invention relates to a method for encapsulating a light-guide optical element in a transparent capsule.

A head-mounted system is an electro-optical device worn on the head by a wearer. Usually such system is electronically controlled so as to switch between different stages or to display information to the wearer. A head mounted system usually presents like a spectacle frame with electronically controlled spectacle lenses.

More particularly, the present invention is concerned with head-mounted system comprise see-around or see-through mechanism.

Head-mounted see-trough display systems are capable of superimposing information, for example computer generated information, over the real-world view. Such Head-mounted see-trough display systems are used in particular for realizing augmented reality.

Since, the wearer sees the real-world trough the head mounted see-through system there is a need to customize such system to the wearer's viewing ability. When the wearer need corrective ophthalmic lenses to see the real world correctly, the head mounted see-trough system should be adapted to such requirements.

Having the wearer seeing the real-world trough the head mounted see-through system requires to provide a high quality head mounted see-through system, in particular in terms of cosmetic and optical requirements.

Furthermore, such system usually comprise a light-guide optical element that is illuminated by an optical system including projector and light source. The position of the light-guide, in particular of the eye motion box relative to the eye is a parameter of great importance to ensure an enhanced quality reality element.

Therefore, there is a need for a high quality assembling method of such a head-mounted see-trough system.

It is an object of the present invention to provide such a high quality assembling method.

To this end, the invention proposes a method for encapsulating at least partly a light-guide optical element in a transparent capsule, the method comprising at least:
- a transparent capsule providing step during which a transparent capsule is provided,
- a light-guide optical element providing step during which a light-guide optical element is provided,
- an adhesive deposing step during which an adhesive is deposited on at least part of a face of the transparent capsule and/or of a face of the light-guide optical element,
- a positioning step during which the transparent capsule and the light-guide optical element are positioned one relative to the other so as to form an optical system,
- a bonding step during which the light-guide optical element and the transparent capsule are made integral with the adhesive, wherein the method further comprises prior to the bonding step a control step during which at least one parameter of the optical system is controlled.

After the bonding step it is very difficult to separate the light-guide optical element and the transparent capsule. The bonding step is therefore a very important step of the see-through system providing process.

Furthermore, the light-guide optical element is a fragile element and when trying to separate the light-guide optical element after the bonding step the breakage rate is high.

Advantageously, the control step of the method of the invention allows controlling parameters of the optical system formed of the light-guide optical element and the transparent capsule prior to the bonding step. The light-guide optical element is a very expensive element. Therefore it is advantageous to have a control step prior to the bonding step so as to be able in case of a non-conformity detection to recover the light-guide optical element prior to the bonding step or to adjust a parameter so as to have an high quality optical system.

Advantageously, the encapsulation method of the invention ensures the bonding of the different parts of the capsule 30 and the light guide optical element 16 with an optimum optical quality and homogeneous optical function.

According to further embodiments which can be considered alone or in combination:
- the control step comprises determining at least one parameter of the optical system and comparing the value of the determined parameter with a reference value of said parameter; and/or
- further to the control step and based on the result of the comparison, the adhesive deposing step and/or the positioning step are repeated until the difference between the value of the determined parameter and the reference value of said parameter is smaller than or equal a threshold value; and/or
- during the control step at least one cosmetic parameter of at least one surface of the transparent capsule and/or the light-guide optical element is controlled; and/or
- during the control step at least one optical parameter of the optical system is controlled; and/or
- during the control step the relative position of at least one surface of the transparent capsule and at least one surface of the light-guide optical element is controlled; and/or
- the method further comprises a force application step during which a force is applied to the transparent capsule and/or the light-guide optical element to form a layer of adhesive between a face of the transparent capsule and the face of the light-guide optical element; and/or
- the force applied to the transparent capsule is based on the value of the determined parameter; and/or
- the force applied is defined by the application of the weight force of the transparent capsule or the light-guide optical element respectively on the light-guide optical element or the transparent capsule; and/or
- the force applied is defined by the application of a pressure on the light-guide optical element and/or the transparent capsule; and/or
- the pressure is applied using:
  - at least a movable deformable pad or
  - at least a deformable membrane with fluid or solid or vacuum pressure; and/or
- the force applied is modify to adjust the optical parameter, for example the optical power; and/or
- the force is maintained until bonding step is complete; and/or
- during the adhesive depositing step at least a film of adhesive is deposited on a face of the transparent capsule and/or or one of the face of the light-guide optical element; and/or
- during the adhesive depositing step at least one drop of adhesive is deposited on a face of the transparent capsule and/or one of the face of the light-guide optical element with a spin coating method; and/or the bonding step comprises curing the adhesive by UV light and/or visible light and/or temperature treatment.

The invention also relates to a method for providing a head mounted electro-optical system, the method comprising:
- a electro-optical system providing step, during which a electro-optical system is provided, and
- an encapsulating step, during which the electro-optical system is at least partly encapsulated in a transparent capsule by stacking in close contact the electro-optical system with at least one substrate of the transparent capsule and made integral with an adhesive, wherein the encapsulating step is carried out according to the method of encapsulating according to the invention.

According to a further aspect, the invention relates to a computer program product comprising one or more stored sequences of instructions that are accessible to a processor and which, when executed by the processor, causes the processor to carry out the step of the method according to the invention.

The invention further relates to a computer readable medium carrying one or more sequences of instructions of the computer program product according to the invention.

Furthermore, the invention relates to a program which makes a computer execute the method of the invention.

The invention also relates to a computer-readable storage medium having a program recorded thereon; where the program makes the computer execute the method of the invention.

The invention further relates to a device comprising a processor adapted to store one or more sequences of instructions and to carry out at least one of the step of the method according to the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include one or more apparatus for performing the operations herein. Such apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Figure 1B:
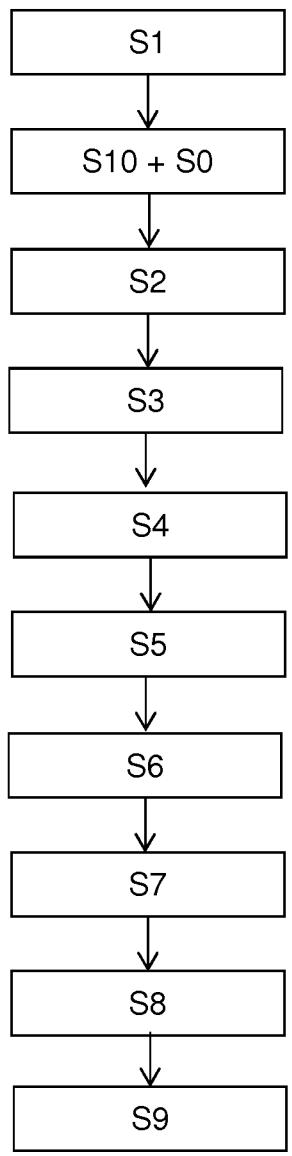
Figure 1C:
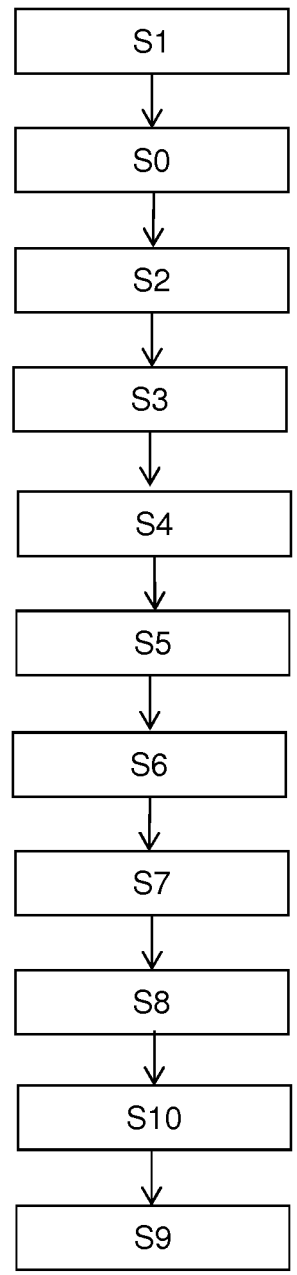
Figure 1D:
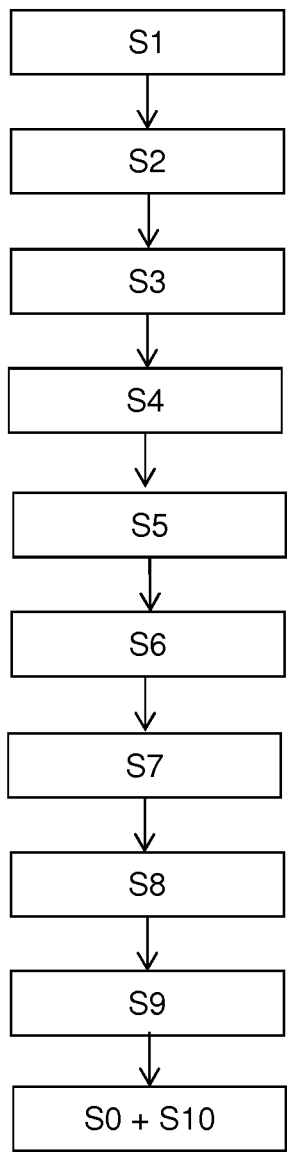
Figure 1E:
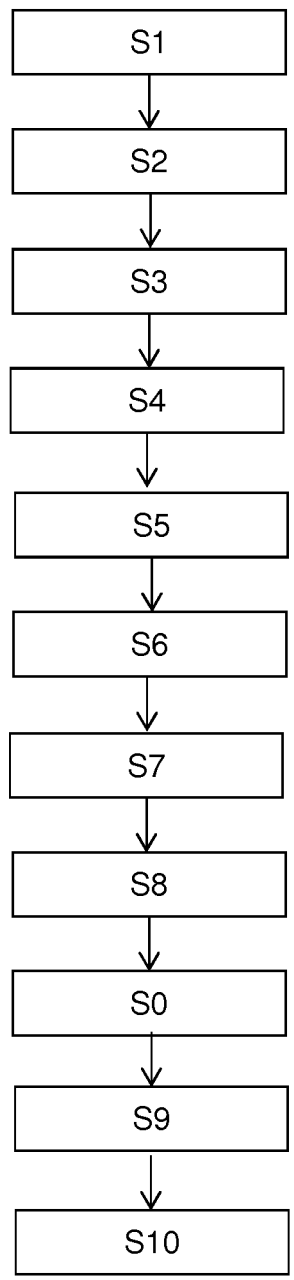
Figure 1F:
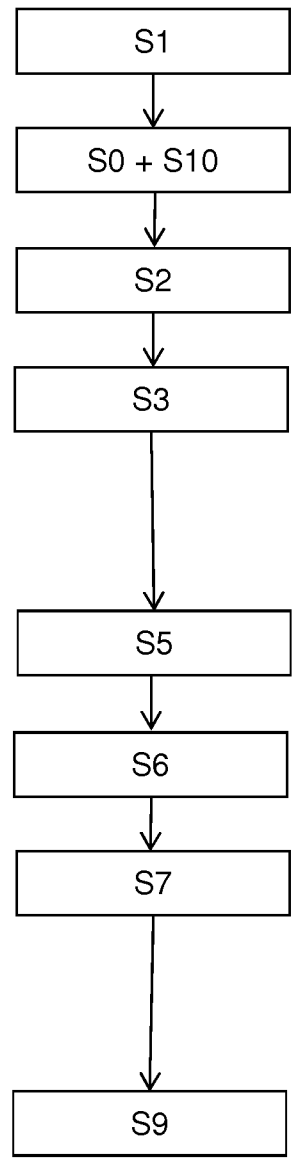
Figure 1G:
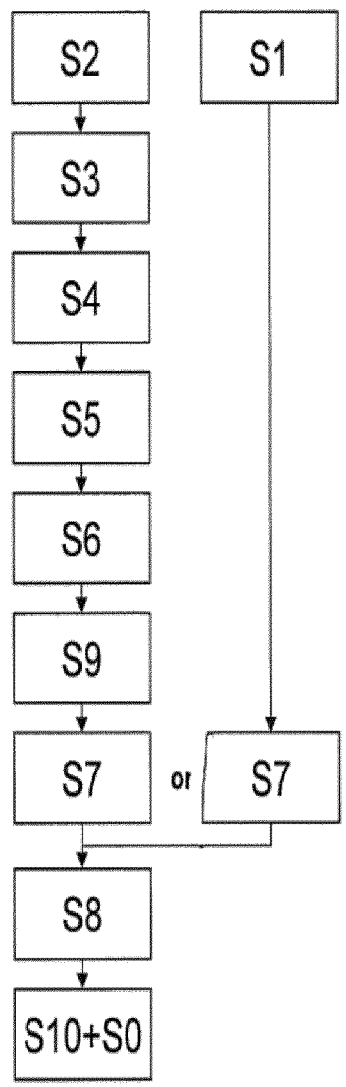
Figure 1H:
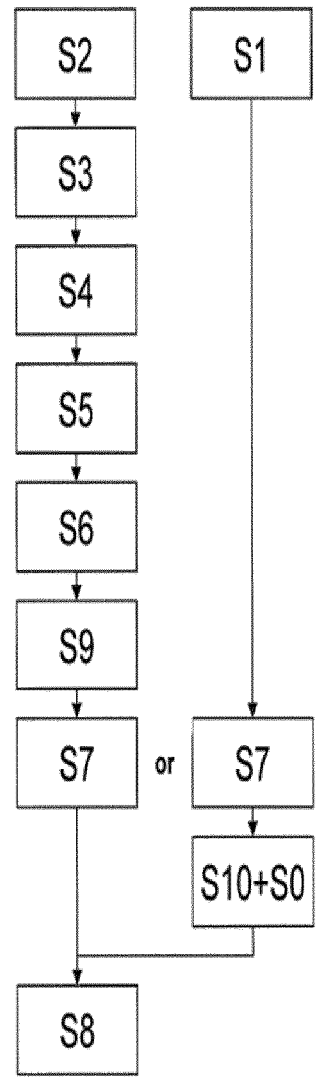
Figure 1I:
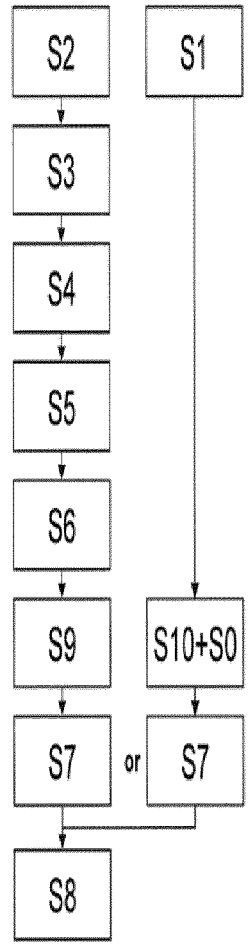
Figure 2:
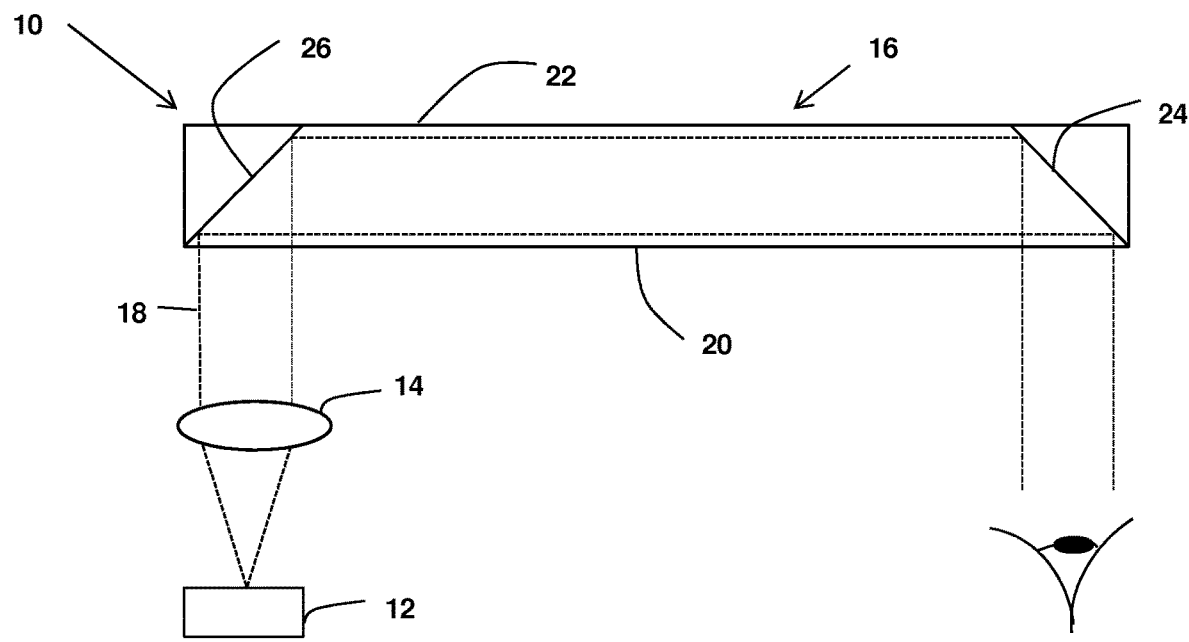
Figure 3:
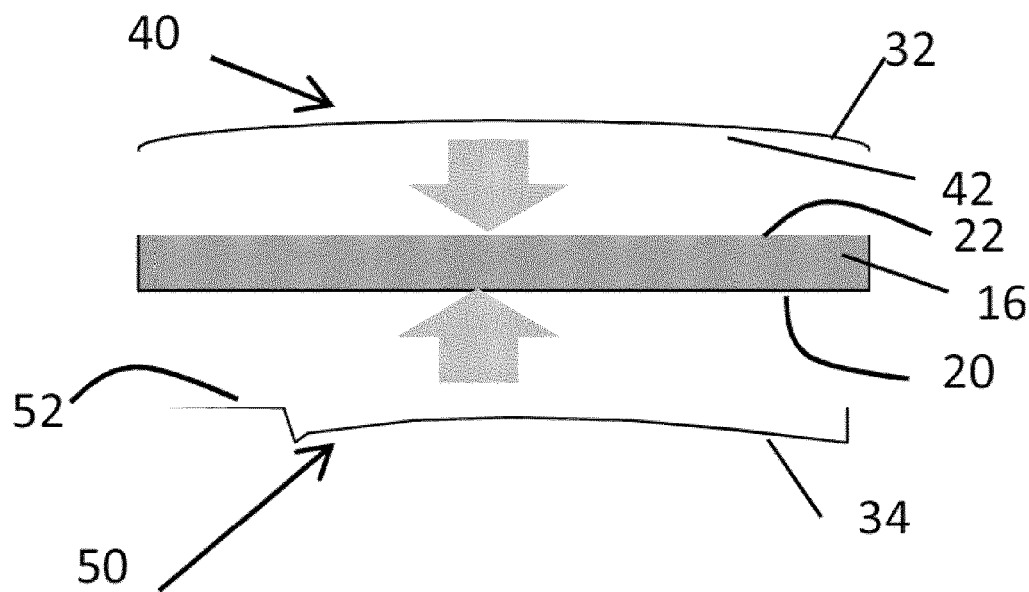
Figure 4:
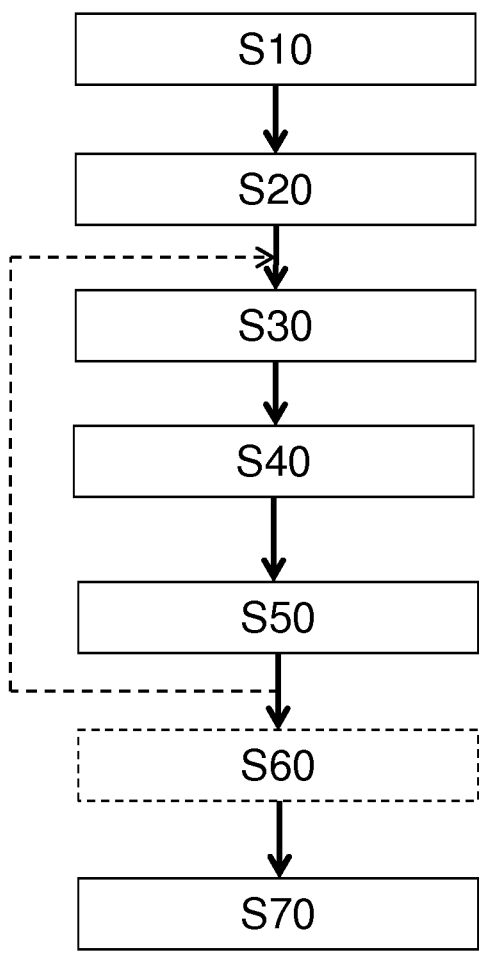

Non limiting embodiments of the invention will now be described with reference to the accompanying drawings in which:

FIGS. 1a to 1i are flowcharts representing the steps of a method according to several embodiments of the invention, FIG. 2 is a schematic view of a see-trough electro-optical system, FIG. 3 is a schematic view of a encapsulating method of the invention, and FIG. 4 is a flow chart of a method according to the invention.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

An example of see-through display system is illustrated on FIG. 2. Such see-trough display system 10 comprises a display source 12, a collimating device 14, and an optical insert 16 constituted by a light-guide optical element 16 (LOE).

Such see-trough display system 10 allows a two-dimensional image source to be imaged to infinity or not and reflected into the eye of the wearer.

The display source 12 can be emissive or not emissive.

It can be directly obtained from either a spatial light modulator (SLM) such as a cathode ray tube (CRT), a liquid crystal display (LCD), an organic light emitting diode array (OLED), a scanning source, liquid crystal on silicon (LCoS) or similar devices, or indirectly, by means of a relay lens or an optical fiber bundle. The display source 12 comprises an array of elements (pixels) imaged to infinity by the collimating device 14, for example a collimating lens.

The light-guide optical element 16 typically includes at least two major surfaces 20 and 22 and edges, at least one partially reflecting surface 24 and an optical element 26 for coupling light thereinto. The output waves 18 from the collimating device 14 enter the light-guide optical element 16 through its lower surface 20. The incoming waves (towards the light-guide optical element 16) are reflected from the surface 26 and trapped in the light-guide optical element 16.

The collimating device 14 can easily be integrated into a single mechanical module which may be assembled independently of the light-guide optical element 16, with fairly relaxed mechanical tolerances.

In a preferred implementation represented on FIG. 3, the light-guide optical element 16 (edged or not) is stacked in close contact between two substrates assembled to form the first face 32 and the second face 34 of the transparent capsule 30 and made integral with an adhesive.

As illustrated in FIG. 3, the first substrate 40 may be a wafer with a face corresponding to the first optical face 32 of the transparent capsule 30 and an opposite internal face 42 facing the LOE 16.

The second substrate 50 may be a wafer with a face corresponding to the second optical face 34 of the transparent capsule 30 and an opposite internal face 52 facing the LOE 16.

Although the first optical face 32 is represented as convex and the second optical face 34 is represented as concave in FIG. 3, it will be appreciated that the first face 32, respectively the second face 34, could equally well be concave, respectively convex, or any other curved, progressive or complex surfaces.

Furthermore, although on FIG. 4, the LOE is shown as encapsulated between two wafers, the invention also relates to the case where only one wafer, is made integral with the LOE, for example the front or rear wafer.

The invention relates to a method for encapsulating at least partly a LOE 16 in a transparent capsule 30. As illustrated on FIG. 4, the method comprises:

a transparent capsule providing step S10,
a light-guide optical element providing step S20,
an adhesive deposing step S30
a positioning step S40
a control step S50,
optionally a force applying step S60, and
a bonding step S70.

In the sense of the invention, the wording transparent is to be understood as allowing light to pass so that a person may see-through the capsule.

These various steps will be detailed for the bonding of the first substrate 40 forming the first optical face 32 of the capsule 30 and the corresponding major surface 22 of the light guide optical element 16. Of course, such a method is applicable similarly to the eventual bonding of the second substrate 50 forming the second optical face 34 of the capsule 30 and the major surface 20 of the light guide optical element 16 facing.

During the transparent capsule providing step S10, at least one of the first substrate 40 and second substrate 50 is provided. Prior to the transparent capsule providing step, at least one substrate of the transparent capsule 30 may be made by casting, molded, in particular molded by injection or machined so as to form the respective face of a lens.

Advantageously and optionally, the substrates may be treated by surfacing and polishing and cut by trimming to the form of the finished lens ready for placing on a spectacles frame.

In an embodiment, the substrates 40, 50 of the capsule 30 are in organic material.

In an alternative embodiment, the substrates 40, 50 of the capsule 30 are in mineral material.

Advantageously, the residual stresses induced during the manufacture of the substrates are such that the manufactured substrates do not deform or warp.

During the light-guide optical element providing step S20, an LOE is provided.

As indicated previously, the light-guide optical element 16 typically includes at least two major surfaces 20 and 22 and edges, at least one partially reflecting surface 24 and an optical element 26 for coupling light thereinto. The output waves 18 from the collimating device 14 enter the light-guide optical element 16 through its lower surface 20. The incoming waves (towards the light-guide optical element 16) are reflected from the surface 26 and trapped in the light-guide optical element 16.

In an embodiment, the electro-optical system may comprise a plane light-guide optical element 16 with at least two planes major surfaces 20 and 22. For example, such a light guide optical element 16 may be one of Lumus Company.

In an alternative embodiment, the electro-optical system may comprise a curved light-guide optical element 16.

An example of elliptic diopter with semi-reflective elliptic surface is illustrated in FR2866123.

The LOE 16 may be provided as such or with one of the surfaces of the LOE 16 bonded to one of the substrates of the transparent capsule 30.

During the adhesive deposing step S30, an adhesive is deposited on at least part of a face of the transparent capsule 30, for example a surface one of the substrates, and/or a face of the LOE 16.

According to an embodiment of the invention, during the adhesive deposing step S3 at least one drop of adhesive is deposited on the internal face 42 of the first substrate 40.

In an embodiment, the drop of adhesive is deposited at the center of the internal face 42 of the first substrate 40.

In an alternative embodiment, several drops of adhesive may be distributed in a matrix on the internal face 42 of the first substrate 40.

The deposition techniques may be any techniques well known to those skilled in the art.

In an alternative embodiment, at least a drop of adhesive is deposited in the major surface 22 of the light guide optical element 16 facing the internal face 42 of the first substrate 40.

In another alternative embodiment, at least a drop of adhesive is deposited in the major surface 22 of the LOE 16 facing a drop of adhesive deposited on the internal face 42 of the first substrate 40, in order to avoid the appearance of bubbles in the adhesive during the first contact of the two drops of adhesive.

The amount of adhesive must be sufficient to form a continuous adhesive film over the entire internal face 42 of the capsule substrate 40.

Furthermore, according to further embodiments of the invention, the adhesive deposing step S30 comprises depositing at least a film of adhesive on a face of the transparent capsule 30 and/or or one of the face of the light guide optical element 16, such as for example a pressure sensitive adhesive In an alternative embodiment, the adhesive deposing step S30 comprises depositing at least one drop of adhesive on a face of the transparent capsule 30 and/or or one of the face of the LOE with a spin coating method.

During the positioning step S40, the transparent capsule 30 and the LOE 16 are positioned one relative to the other so as to form an optical system.

For example, the first substrate 40 of the capsule 30 is placed on a movable holder with its first optical face 32 facing upwardly and the opposite internal face 42 facing a major surface 20 of the light guide optical element 16.

The light guide optical element 16 is also placed on a movable holder.

The light guide optical element 16 and the first substrate 40 supported in the associated holders are positioned relative to each other in order to position the optical center of the first optical surface 32 of the capsule 30 relative to the center of the eye motion box of the light guide optical element 16.

The relative position may also include other parameters, for example if the light guide optical element 16 and the first substrate 40 having specific contour shape, for example the shape of the eyewear that will support the optical system, the relative position may be achieved so that the shape of the light guide optical element 16 and the first substrate 40 are superposed.

Such a positioning step is applicable similarly to the eventual positioning of the second substrate 50 forming the second optical face 34 of the capsule 30 and the light guide optical element 16 facing.

During the control step S50, at least one parameter of the optical system formed of at least the first 40 and/or second 50 substrate and the LOE 16 is controlled.

According to an embodiment of the invention, the control step comprises determining at least one parameter of the optical system and comparing the value of the determined parameter with a reference value of said parameter.

Further to the control step S50 and based on the result of the comparison, the adhesive deposing step S30 and/or the positioning step S40 are repeated until the difference between the value of the determined parameter and the reference value of said parameter is smaller than or equal a threshold value.

The threshold value may depend on the required level of quality and on the parameter of the optical system being controlled.

According to an embodiment, during the control step S50, at least one cosmetic parameter of the optical system may be controlled. For example, the cosmetic parameter may relate to one of the surfaces of the transparent capsule 30 and/or the first or second substrates 40, 50 and/or the LOE 16.

Typically, the cosmetic parameter may relate to the presence of dust on or between the surfaces of the optical system formed of the transparent capsule 30 and the LOE 16, for example between the surfaces of the substrates and the surfaces of the LOE. The presence of dust may reduce the optical quality of the optical system.

Typically, upon detection of the presence of dust prior to the bonding step, the LOE 16 and the first and/or second substrate 40, 50 of the transparent capsule 30 may be separated and dust off.

The cosmetic parameters may relate to the surface conditions of the different surfaces of the optical system, for example relate to the presence of scratch on one or other of the surfaces.

The cosmetic parameter may further relate to the presence of air bubbles between the first and/or second substrate 40, 50 of the transparent capsule 30 and the LOE 16. Such bubbles reduce the optical quality of the optical system and therefore should be removed.

The cosmetic control may be carried out by any means known from the skilled person, such as using a camera to provide digital images of the surfaces of the optical system and using appropriate illuminating means (IR light, visible light, backlight, grazing light . . . ) to detect the cosmetic defects.

According to an embodiment, during the control step S50, the relative position of at least one surface of the transparent capsule and at least one surface of the light-guide optical element is controlled.

Such control may be done by any known control method.

In an embodiment, the accurate relative positioning of the capsule 30 and the light guide optical element 16 may be achieved by using positioning references on the first and/or second substrates 40, 50 of the capsule 30 and/or the light guide optical element 16.

The positioning references may also be the contour shape of the light guide optical element 16, particularly when the shape is adapted to the head mounted system or eyewear that will support the optical system.

According to a preferred embodiment, the LOE 16 and the substrate 40 supported in the associated holders are positioned relative to each other in order to position the optical center of the first optical surface 32 of the capsule 30 relative to the center of the eye motion box of the light guide optical element 16.

A movable frame may be used as a positioning reference to position the transparent capsule 30 and the light guide optical element 16 relative to each other.

A camera associated with a target may be used as positioning reference to guide the moving of the transparent capsule 30 and the light guide optical element 16 relative to each other. The analysis of the images of the capsule 30 and the light guide optical element 16 gives the precise position and orientation of each of the capsule 30 and the light guide optical element 16 relative to the camera and relative to the target.

According to an embodiment, during the control step 50, at least one optical parameter of the optical system may be controlled.

For example the sphere, the cylinder, the prism of the optical system may be controlled at reference points.

The control of the optical property may consider the transfer rule linked to the adhesive layer between the transparent capsule 30 and the LOE 16.

The control device is selected so not to start the bonding process. Typically, the control device may use lightning means that are selected so as not to react with the initiator of the adhesive, for example excluding the use of UV light.

The control device used during the control step may comprise:
- a kit (comprising optical means for centering and cosmetic) that comes up to an apparatus for optical measurement, such as a Lensmeter, or
- a set of stations (cosmetic control, optical control, positioning control, balance control) wherein the optical system passes from one to another. A station may be configured to carry out a plurality of controls if needed.

The optical system can be placed in a visualization and lighting system. After detecting the edge image of the two objects, LOE 16 and first and/or second substrate 40, 50, an image processing software measures the relative position of the two elements.

Technical solutions and positions of the elements can be adapted to obtain the best possible image (below camera, telecentric lens, lighting below, wavelength, . . . ).

The wavelength of the lightning system is chosen so as not to cure the adhesive, for example using IR.

Grazing light may be used to control cosmetic defects such as bubbles and/or dust and visualize the contour of the substrate 40, 50 and the LOE 16 so as to control position parameters.

Typically, on may determine a distance between the edges of two elements that are to meet a given value to ensure proper positioning.

One can also use marks present on the glass for positioning control. These marks may be particularly microengravings, markings pad printing or markings made by a lensmeter.

One can measure the relative position of two elements or of only one of the two elements with respect to an external equipment for positioning the optical system in the control device.

The control system for the positioning, optical and cosmetic parameters may be the same.

The method according to the invention optionally comprises a force application step S60 during which a force is applied to the transparent capsule 30 and/or the light-guide optical element 16 to form a layer of adhesive between a face of the transparent capsule 30 and the face of the light-guide optical element 16 facing.

According to a preferred embodiment, the force applied during the force application step S60 is based on the value of the determined parameter during the control step S50.

The method according to the invention may comprise a feedback loop from the control step to the force application step so as to adapt the force applied based on the value of the determined parameter during the control step S50.

Although not represented as such on FIG. 4, the force may be applied during the bonding step.

For example, the optical power at a reference point of the optical system is measured and the intensity of the force applied to the transparent capsule 30 and/or the light-guide optical element 16 is determined based on the value of the measured optical power so that the force applied permit to attain the desired optical power. The force applied on the transparent capsule and/or light guide optical element will induce a slight geometrical deformation, particularly on the base curve of the transparent capsule, that will permit to modify the optical power of the optical system.

The force may be applied over a short period of time, improving the production time of the at least partially encapsulated guide optical element 16 with a transparent capsule 30.

In an embodiment, the force applied on the adhesive and the light guide optical element 16 is defined by the application of the force of gravity due to the weight of the first substrate 40 simply placed on the major surface 22 of the light guide optical element 16.

In another embodiment, the force applied on the adhesive and the first substrate 40 is defined by application of the force of gravity due to the weight of the guide optical element 16 placed on the internal face 42 of the first substrate 40.

The inventors have found that the application of the weight of the capsule 30 or the light guide optical element 16 on the respective corresponding light guide optical element 16 and the substrate is sufficient to obtain an optimal quality of bonding and a high optical quality for the resultant encapsulated electro-optical system.

In another embodiment, the force applied is defined by the application of pressure to the first substrate 40 and/or the light guide optical element 16.

The pressure applied must be uniform and sufficient to recover a light warpage.

Various methods to apply pressure on the first substrate 40 and/or the light guide optical element 16 are used.

In an embodiment, pressure may be applied using a movable deformable pad.

The pad is supported by a supporting element and moved up and down by displacement means.

A sensor may be used to control the pressure applied to the pad during the force application step S60. Such sensor may be link to the controlled optical and/or position parameters.

Depending on whether the first substrate 40 is applied to the light guide optical element 16 or the contrary, the pad is applied respectively to the first optical face 32 of the first substrate 40 or the major surface 20 of the light guide optical element 16 opposite the major surface 22 to be bonded.

During step S60, the pad is moved to come into contact with the first optical face 32 of the first substrate 40.

During the application of the pad against the first substrate 40, the pad is deformed and conforms to the curvature of the first optical surface 32 of the capsule.

Additional displacement of the pad pushes down the first substrate 40 towards the facing major surface of the light guide optical element 16 to form a thin continuous layer of adhesive between the internal face 42 of the first substrate 40 and the surface 22 of the light guide optical element 16 facing.

In an embodiment, the pressure is applied in a central portion of the first substrate 40.

With respect to the pad, it may be made with silicone material.

In an embodiment, the face of the pad applied to the first substrate 40 may be plane or may be conformed to the shape of the first optical face 32 of the first substrate 40.

In an alternative embodiment, the pad is replaced by a deformable water balloon.

Furthermore, in an alternative embodiment, the pressure may be applied by at least a deformable membrane associated with a vacuum or fluid or solid pressure. Preferably the deformable membrane is made of a transparent material, such as silicone, so as to make the control step easier to carry out.

The force application step may be carried out by various apparatus known in the art.

According to an embodiment, the light guide optical element 16 and the capsule 30 are hold by their movable holding means in a vacuum chamber.

The vacuum chamber has a side wall which is for example cylindrical with a vertical axis. It is provided with a clamping ring, in order to keep a membrane fixed against the upper peripheral edge of the side wall. The chamber is thus closed off in a sealed manner on its upper face. The chamber is placed above a base at a fixed height.

When the chamber is placed in a vacuum step, the membrane is deformed to conform to the first optical face 32 of the first substrate 40 or the major substrate 22 of the light guide optical element 16 depending whether the first substrate 40 or the light guide optical element is facing the membrane.

The deformation of the membrane pushes down the first substrate 40 towards the facing major surface 22 of the light guide optical element 16 to form a continuous layer of adhesive between the internal face of the first substrate 40 and the face of the light guide optical element 16 facing.

During the releasing step, the vacuum is released and therefore, the light guide optical element 16 and the transparent capsule 30 are made integral with the adhesive.

According to an alternative embodiment, the vacuum is replaced by a fluid pressure introduced in a cavity in order to inflate the deformable membrane.

The fluid may be a gas or a liquid.

In an alternative, the fluid pressure or the vacuum pressure is replaced by a solid pressure.

The injection of gas in the cavity deforms the membrane and the membrane inflates and pushes down the first substrate 40 towards the facing major surface 22 of the light guide optical element 16 to form a continuous layer of adhesive between the internal face of the first substrate 40 and the face of the light guide optical element 16 facing.

The method may further comprise a releasing step during which the applied force is released. The releasing step may be prior to or after the bonding step S70.

During the bonding step S70, the LOE and the transparent capsule or at least one of the first and second substrate are made integral with the adhesive provided during the adhesive providing step S30.

The adhesive may be a predetermined dose of curable adhesive material.

The use of a curable adhesive material requires a light radiation and/or heating during the bonding step S70 for obtaining permanent bonding.

The light radiation is chosen relative to the initiator of the curable adhesive material selected. The light radiation may by UV light and/or visible light depending on the choice of the initiator of the curable adhesive material As illustrated on FIG. 4, the invention further relates to the method for providing a head mounted see-through system adapted to a wearer, comprises:
- a see-through electro-optical system providing step S1,
- a wearer data providing step S2,
- an encapsulating step S8 and
- a customizing step S9.

During the see-trough electro-optical system providing step S1, a see-trough electro-optical system is provided.

In the sense of the invention, an "electro-optical system" is a system with a switchable function (active function) that enables at least part of the active function of the system to be controlled by means of an electrical stimulus.

The active function of the lens may be of various types.

It may be a function of reinforcing contrast by adapting the tint of the lens, e.g. as described in U.S. Pat. No. 6,250,759. It may be also be a function of reinforcing contrast by filtering light with a determined direction of polarization.

For example the electro-optical means may comprise a system having a variable light transmission. Such system may be of the electrochromic type. In a preferred manner, it is a system with little electricity consumption, such as a system based on liquid crystals or a system of electrophoretic type. For such systems, the electrical stimulus that leads to a variation in light transmission is an electric field, i.e. it corresponds to an electrical voltage being applied across two input terminals of the system. Electricity consumption is low, and is compatible with an electrical power supply of small dimensions.

In another embodiment, the active function of the lens may be a diffractive or holographic optical element.

In another embodiment, the active function of the lens may be brought in pixelized form.

For example, the optical function may be of the Fresnel type or of the Alvarez and Lohmann refractive type.

The see-trough electro-optical system may also be a display system arranged to display information over the real world view. For example, the display system is arranged to display computer generated information over the real world view, thus allowing realizing augmented reality device.

With such augmented reality device the viewer's image of the world is augmented with overlaying information.

During the wearer data providing step S2, wearer data comprising at least the wearer's prescription is provided. The wearer data may comprise further information concerning for example the type, shape, dimension of spectacle frame the wearer has selected and/or the wearer interpupillary distance and/or wearing condition parameters or any information concerning the wearer that may be useful for the lens provider.

The wearer's prescription is a set of optical characteristics of optical power, of astigmatism and, where relevant, of addition, determined by an ophthalmologist in order to correct the vision defects of the wearer, for example by means of a lens positioned in front of his eye. For example, the prescription for a progressive addition lens comprises values of optical power and of astigmatism at the distance-vision point and, where appropriate, an addition value.

For example, the wearer's prescription may be the prescription of an emmetropic wearer.

The encapsulating step comprises the steps of the method for encapsulating according to the invention.

Advantageously, in the various embodiments, the substrates 40, 50 of the transparent capsule 30 have also a protective function of the optical system and especially the LOE and also can offer a degree of curvature to a flat LOE, in order to improve the aesthetics of the optical head mounting system.

Moreover, the encapsulating step may be implemented to encapsulate at least partially a LOE with either a plane shape or a curved shape.

In an alternative embodiment, it will be appreciated that the optical insert 16 could not be encapsulated and forms a blank optical insert (Blank LOE).

Advantageously, the blank optical insert 16 may be treated by surfacing and polishing and cut by trimming to the form of the finished lens ready for placing on a spectacles frame.

During the customizing step S9, in a first embodiment, at least one face of the transparent capsule 30 is customized according to the wearer data.

In this embodiment, it should be noted that the encapsulation may be done temporarily.

During the customizing step S9, in a second embodiment, at least one face of the see-through electro optical element is customized according to the wearer data.

The term "customizing" is used herein to designate any definitive addition of a corrective optical function adapted to the wearer data: it is not possible to remove the corrective optical function without causing damage to either related corrective optical function and see through electro optical system or related corrective optical function and transparent capsule 30.

The term "customizing" used herein excludes corrective clips or temporary, re-usable corrective patches.

For example, the wearer data comprise the wearer prescription. The corrective optical function to be provided to the wearer is determined as for conventional ophthalmic lenses and at least one of the faces of the transparent capsule 30 is customized so as to provide such corrective optical function.

According to an embodiment, the second face 34 of the transparent capsule is to be modified, for example by a manufacturing method, so as to provide the back face 35 of the finished transparent.

The second face 34 may be modified by machining the surface of said second face 34, using a machining tool or by adding an optical patch having an optical function that adds up with the optical function of the transparent capsule to provide the desired optical function.

While in this embodiment of the invention, the back face of the transparent capsule 30 is customized, it will be understood, that in alternative embodiments of the invention the front face 32 may be customized or both front 32 and back 34 faces may be customized.

Otherwise, in alternative embodiments of the invention, the front and/or back faces of the see-trough electro-optical system is customized so as to provide such corrective optical function.

Therefore, according to the invention, a see-through electro-optical system provider may provide generic see-through electro-optical system, i.e. not adapted to the specific need of each individual wearer, and the lens provider may provide non encapsulated generic see-trough electro-optical system customized for the specific need of each wearer, as for ophthalmic lenses.

According to an embodiment of the invention, the method may further comprise after the wearer data providing step S2 and prior to the customizing step S9:

a see-through electro optical system data providing step S3,
a capsule data providing step S4,
an optical function determining step S5, and
a surface data determining step S6.

See-through electro optical system data representing at least the shape of the faces of the see-through system prior to the encapsulation step and the optical index of the see-through system is provided during the see-through electro optical system data providing step.

Capsule data representing at least the optical index of the transparent capsule is provided during the capsule data providing step S4.

In a preferred embodiment, capsule data representing the shape of the first and/or the second faces of the capsule is also provided during the capsule data providing step S4.

The shape of the first and second faces is to be understood as at least the surface of the faces and their orientations in a common reference system.

Using the wearer's data and the see-through system's data, the optical function ie a diopter correction based on the wearer's prescription to be provided to the wearer is determined. The optical function is determined so as to assure a corrected vision for said wearer when looking through the head mounted electro-optical system. The determination of such optical function can be implemented using the calculating tools that lens designer and/or provider use.

The method according to the invention can thus be applied with prescription glasses, glasses of rest, exercise eye glasses or any other examples.

In an alternative embodiment, the optical function to be provided to the wearer is determined using, also, the capsule data.

Once the optical function is determined, surface data is determined during the surface data determining step S6.

According to a first embodiment of the invention, the surface data represent the surface of at least one face to be customized of the capsule. Said surface data is determined according at least to the optical function and the capsule data.

According to a second embodiment of the invention, the surface data represent the surface of at least one face to be customized of the optical insert 16.

During the surface data determining step S6, it is determined which of the front and/or back face(s) of the transparent capsule or of the optical insert 16 is to be customized.

When the see-trough electro-optical system is a display system it may be advantageous to have all the optical function be carried out by the back surface. Indeed, the information displayed by the see-trough electro-optical system is seen once encapsulated by the wearer only through the back surface of the transparent capsule. Therefore for the wearer to benefit fully of the ophthalmic correction such ophthalmic correction should be carried by the back surface.

In an alternative embodiment, the surface data determining step is replaced by an index map determining step S6 which index map representing the index variation of at least one face to be customized of the capsule is determined according to the optical function and the capsule data.

In an alternative embodiment, when the customizing step S9 consists in adding a diffractive or holographic optical element on the front and/or back faces of the transparent capsule 30, the surface data determining step is replaced by a diffractive map determining step S6 which diffractive map representing the diffractive variation of at least one face to be customized of the capsule is determined according to the optical function and the capsule data.

The method according to the invention may further comprise a mounting step S10 during which at least a part of the encapsulated see-trough electro-optical system is mounted in a spectacle frame. For example, the encapsulated see-trough electro-optical system is mounted in a spectacle frame chosen by the wearer.

In an alternative embodiment illustrated in FIG. 1f, during the mounting step S10, at least a part of the non-encapsulated see-through electro-optical system is mounted in a spectacle frame 4.

Furthermore, FIGS. 1a to 1g illustrate different flowcharts representing the successive steps of a method according to several embodiments of the invention, In order to simplify the overall process as illustrated in FIGS. 1d, 1e, 1g, the customizing step S9 is implemented prior to the mounting step S10. Such sequence is particularly interesting when the customizing step S9 requires machining one of the surfaces of the transparent capsule 30. Indeed, the machining of one of the surfaces generally requires rotating the transparent capsule 30 and having a machining tool machine one of the surfaces. Such operation can not easily be implemented once the transparent capsule 30 is mounted on a spectacle frame.

When the customizing step S9 consists in adding one of two optical patches on the front and/or back faces of the transparent capsule 30, the customizing step S9 may be implemented after the mounting step S10, as illustrated in FIGS. 1a, 1b, 1 c and 1f. Such embodiment allows having the see-trough electro-optical system provider provide a standard mounted head mounted system that is subsequently customized, for example by a lens provider or by the wearer himself.

Advantageously, the customization is delayed in the lens production process, thereby simplifying the overall industrial process. Late customization allows for the maximum stage of standards implementation.

Moreover, the embodiment of FIGS. 1a, 1b, 1c and 1f also allows a wide variety of processes.

When the customizing step S9 consists in defining a discrete optical function to the face to be customized of the capsule 30 (or to the face to be customized of the optical insert 16 in the embodiment without encapsulating step), the customizing step S9 may also be implemented after the mounting step S10 with the same advantages.

In an alternative embodiment, defining a discrete optical function to the face to be customized may be implemented prior the mounting step S10.

The addition of the discrete optical function may be implemented by technologies based on the discretization of a blank of the capsule in pixels.

The expression "discrete optical function" may refer in particular to a function provided by a complex pixellated or microstructured structure comprising at least one transparent set of cells juxtaposed parallel to a surface of the component, The cells can be filled with various functional substances chosen for their optical properties, for example associated with their refraction index, their light absorption, their response to electrical or light stimuli, etc.

Such films are in particular able to embody a number of functions within their composition.

The expression "discrete optical function" may also refer in particular to a function provided by incorporating at least an active material having an irradiation modifiable optical property.

Active material are distributed in respective layers superimposed with the capsule or the capsule is made of active material.

The modifiable optical property may comprise a light absorption property and/or the refringence of the active material.

The irradiation of the active material can be carried out by exposing the active material to an appropriate beam through a mask or by using a laser.

The expression "discrete optical function" may also refer in particular to a function provided by incorporating additive components distributed in respective layers superimposed with the capsule or within the capsule or by defining a Fresnel surface.

According to an embodiment illustrated in FIGS. 1g, 1h and 1i, the customizing step S9 of the capsule 30 is implemented prior to the encapsulating step S8. Such sequence is particularly interesting when the customizing step requires machining one of the surfaces of the transparent capsule. Indeed, such sequence reduces the risk of damaging the see-trough electro-optical system during the machining of one of the surfaces.

Such embodiment, as embodiment illustrated in FIGS. 1g, 1h and 1i, are particularly advantageous: Such sequence allows to decorrelate work on the capsule of the entire process. The optical part of the process is uncorrelated to the electronic part of the process. The latter is facilitated and the quality of the head mounted system is improved.

According to an embodiment of the invention, the customizing step S9 may comprise machining one or both of the faces of the transparent capsule and adding an optical patch or a discrete optical function on at least one of the machined faces, or on both of the machined optical faces.

According to such embodiment, the machining part of the customizing step S9 is carried out prior to the encapsulating S8 and mounting S10 steps whereas the patch part or the discrete optical function part may be carried out after the mounting step S10.

In an alternative, the machining part and the patch part or the discrete optical function part may be carried out after the mounting step S10.

Moreover, when the customizing step S9 consists in adding one of two optical patches on the front and/or back faces of the transparent capsule 30, the edging step may be optional.

When the method further comprises a display mounting step S0, the display mounting step may be implemented prior to the encapsulating step S8.

Furthermore, such operation S0 can be easily implemented concurrently with a customizing step S9 of the transparent capsule 30 made prior to the encapsulating step S8 as illustrated in particular in FIGS. 1h and 1i.

Advantageously, the display step S0 can be performed without disturbing the customizing step S9 and the encapsulating step S8 since the steps are decoupled.

Furthermore, such operation S0 can be easily implemented at the same time with mounting step S10 or before the latter S10, as illustrated in FIGS. 1a, 1b, 1d, 1f, 1g, 1h and 1i.

According to the embodiment of FIG. 1d, 1a and, 1g, the display mounting step S0 is delayed in the progress of the production process. Advantageously, customization may be facilitated and the head mounted system quality is improved because the display is not embarrassing at the time of the encapsulating step and/or of the customizing step.

The method according to the invention may further comprise an insulating step S7, during which the see-through electro optical system and/or the capsule 30 is at least partly insulated.

The insulation step S7 comprises:
an insulation function determining step, during which the insulation function according to the see-through system data is determined, and
an insulation data determining step, during which insulation data representing at least the optical index(es) of at least one face to be insulated of the see-through system or the capsule 30 is determined according to the insulation function and the see-through system data.

Advantageously, the insulation data represents the reflectance data, transmission data, optical index(es) and polarization data of at least one face to be insulated of the see-through system or the capsule 30 is determined according to the insulation function and the see-through system data.

According to this embodiment, the see-through system data also include at least the optical index(es) of the see-through electro optical system.

Advantageously, the see-through system data represents the reflectance data, transmission data, optical index(es) and polarization data of the see-through electro optical system.

According to an embodiment, the insulation step S7 is implemented prior to the encapsulation step S8.

According to another embodiment, the capsule insulation step S7 is implemented after the encapsulation step S8.

According to an embodiment, the capsule insulation step S7 is implemented after the customizing step S9 as illustrated in FIG. 1g.

According to an embodiment, the capsule insulation step S7 is implemented after the mounting step S10 as illustrated in FIG. 1i.

During the insulation step S7, the face of the capsule 30 or the face of the see through electro optical system is subjected to isolator treatment to ensure a high degree of reflection of said face.

The insulation may be implemented by means of a hologram operating in reflection, or by means of coating technologies or any known insulation technology.

While the foregoing examples have been described with reference to an electro optical system, it will be appreciated that the method of the invention may be applied to optical system with a switchable function (active function) that enables at least part of the active function of the system to be controlled by means of stimulus other than electrical ones such as manual or radiation stimuli.

Therefore, the active function may include at least one or more active functions selected from the group consisting of:
a display information function;
an electrochromic function;
an photochromic function;
a polarizing function;
an anti-fog function;
a tinted function.

Such several active functions may improve optical or mechanical properties of the head mounted optical system.

With respect to a see through display optical system, several active functions such as the active functions listed above may be added to the display function.

More particularly, when the optical insert 16 is partly encapsulated in the transparent capsule 30 on one of his face or fully encapsulated in the transparent capsule 30, several active functions listed above may be added to at least one face of the optical insert 16 and/or one face of the transparent capsule 30 such as one or both the major surfaces 20, 22 of the optical insert 16 and/or the first optical face 32 and/or a second optical face 34 of the transparent capsule 30.

In that way, with respect to the electrochromic function, an electrochromic function may be provided on one surface of the optical insert 16 or to a face of the of the transparent capsule 30 such as the first optical face 32 and/or the second optical face 34

In non limitative examples, the electrochromic function may be provided by an electrochromic layer as described herewith below, or by a complex structure comprising at least one transparent set of cells juxtaposed parallel to a surface of the component filled with various functional substances chosen for their optical properties associated with, their response to electrical stimuli, etc, or by a polymer material gel or polymer material liquid known from the State of Art.

Besides, with respect to the photochromic function, photochromic materials are capable of switching between a clear state to a state where they are colored. The materials change states based, on the amount and wavelength of radiation they encounter.

In non limitative examples, the photochromic function is provided by incorporating photochromic dyes into the capsule 30 material and/or the insert 16 material, as long as the material is addressed to receive UV light, into an insert or a capsule photochromic layer coating.

In another example disclosed in WO2013006153, the photochromic function is provided by a temporary photochromic film (or patch) that could be easily applied to and conform to the shape and curvature of the first optical face 32 of the transparent capsule 30.

In an embodiment, the temporary photochromic film may be applied to the concave face if the material is not a UV cut filter material.

Moreover, in an embodiment, the method of the invention may further comprise:
 a functional layer providing step during which at least a functional layer is provided and
 a functional layer coating step during which the functional layer is coat to a face of the optical system and/or the transparent capsule.

The functional layer may include one or more layers selected from the group consisting of: a polarizing layer, a photochromic layer, an electrochromic layer, a hard coat layer (abrasion and/or scratch-resistant coating and/or an impact-resistant coating), a top coat layer, an anti-fog layer, an anti-smudge layer, an anti reflective layer, an interferential layer, an anti-static layer and a tinted layer.

Such layers may improve optical or mechanical properties of the head mounted optical system.

When the optical insert 16 is partly encapsulated in the transparent capsule 30 on one of his face or fully encapsulated in the transparent capsule 30, several functional layers listed above may be coat to at least one face of the optical insert 16 and/or one face of the transparent capsule 30 such as one or both the major surfaces 20, 22 of the optical insert 16 and/or the first optical face 32 and/or a second optical face 34 of the transparent capsule 30.

The coating step may include any known solutions to fix the functional layer to the transparent capsule and/or the optical system.

For example, the functional layer is coat with a dip-coating method, a spin-coating method, a vacuum deposition method, a spray-coating method, a film transfer method, a film lamination method or an imbibition process.

In particular, a functional layer may be glued to a face of the transparent capsule 30 and/or the optical system such as the major surfaces of the LOE 16 by a latex glue, a UV curable glue, a HMA (Hot Melt Adhesive) glue, a pressure sensitive adhesive (PSA), or bi-layer adhesive structure disclosed in US 2010/0110567. Such bi layer adhesive structure includes a layer of latex adhesive disposed on a surface of the functional layer and a layer of hot melt adhesive disposed between the latex layer and the capsule 30 or the surface of the optical system such as the surface of the LOE 16, to form a bi-layer adhesive.

This embodiment is particularly well adapted to coat a functional layer with a transfer method and more particularly a film lamination method disclosed in EP 1866144 wherein at least one functional layer as mentioned hereinbefore is coated to a flat film, like a thermoplastic film based on polycarbonate, polyethyleneterephthalate, polyurethane, cyloolefine, or cellulose triacetate.

While the foregoing examples have been described with reference to a see trough electro optical system, it will be appreciated that the method of the invention may be applied to non immersive or immersive electro-optical system such as head mounted display system with see-around mechanism.

While the foregoing examples have been described with reference to the manufacture of an ophthalmic lens, it will be appreciated that the method of the invention may be applied more generally to the manufacture of other types of optical lens, for example optical lens used in telescopes and the like.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for encapsulating at least partly a light-guide optical element in a transparent capsule, the method comprising:
 obtaining a transparent capsule, the transparent capsule including at least one substrate having a first face and an opposite internal face;
 obtaining a light-guide optical element;
 depositing an adhesive on at least one of a part of an internal face of the transparent capsule and/or of a face of the light-guide optical element;
 positioning the transparent capsule and the light-guide optical element one relative to the other to form an optical system; and
 bonding the light-guide optical element and the transparent capsule to each other with adhesive,
 wherein the method further comprises, prior to the bonding, controlling at least one cosmetic parameter of at least one surface of the transparent capsule and/or the light-guide optical element.

2. The method according to claim 1, wherein the controlling further comprises determining a value of the at least one cosmetic parameter of the optical system and performing a comparison by comparing the value of the at least one cosmetic parameter with a reference value of said at least one cosmetic parameter.

3. The method according to claim 2, wherein the method further comprises applying a force to at least one of the transparent capsule and the light-guide optical element to form a layer of adhesive between a face of the transparent capsule and the face of the light-guide optical element.

4. The method according to any of claim 3, wherein the force applied is defined by at least one of the application of a pressure on the light-guide optical element and the transparent capsule.

5. The method according to claim 4, wherein the pressure is applied using:
one of a movable deformable pad and a deformable membrane having one of fluid, solid, and vacuum pressure.

6. The method according to claim 3, wherein the force applied to the transparent capsule is based on the value of the at least cosmetic parameter.

7. The method according to claim 3, wherein the force applied is defined by the application of the weight force of the transparent capsule or the light-guide optical element respectively on the light-guide optical element or the transparent capsule.

8. The method according to claim 3, wherein the force is maintained until bonding step is complete.

9. The method according to claim 3, wherein during the adhesive depositing at least a film of adhesive is deposited on at least one of a face of the transparent capsule and one of the face of the light-guide optical element.

10. The method according to claim 2, wherein further to the controlling and based on a result of the comparison, at least one of the adhesive depositing and the positioning are repeated until a difference between the value of the at least one cosmetic parameter and the reference value of said at least one cosmetic or optical parameter is less than or equal a threshold value.

11. The method according to claim 1, wherein during the adhesive depositing at least a film of adhesive is deposited on at least one of a face of the transparent capsule and one of the face of the light-guide optical element.

12. The method according to claim 11, wherein the method further comprises applying a force to at least one of the transparent capsule and the light-guide optical element to form a layer of adhesive between a face of the transparent capsule and the face of the light-guide optical element.

13. The method according to claim 1, wherein the bonding further comprises curing the adhesive by at least one of UV light, visible light, and temperature treatment.

14. The method according to claim 13, wherein during the controlling the relative position of at least one surface of the transparent capsule and at least one surface of the light-guide optical element is controlled.

15. The method according to claim 1, wherein during the controlling the relative position of at least one surface of the transparent capsule and at least one surface of the light-guide optical element is controlled.

16. The method according to claim 1, wherein during the adhesive depositing at least one drop of adhesive is deposited on at least one of a face of the transparent capsule and one of a face of the light-guide optical element with a spin coating method.

* * * * *